July 3, 1956     P. M. MAZUR     2,752,884
SELF-FEEDING STRUCTURES FOR ANIMAL FOODSTUFFS
Filed March 16, 1953     2 Sheets-Sheet 1
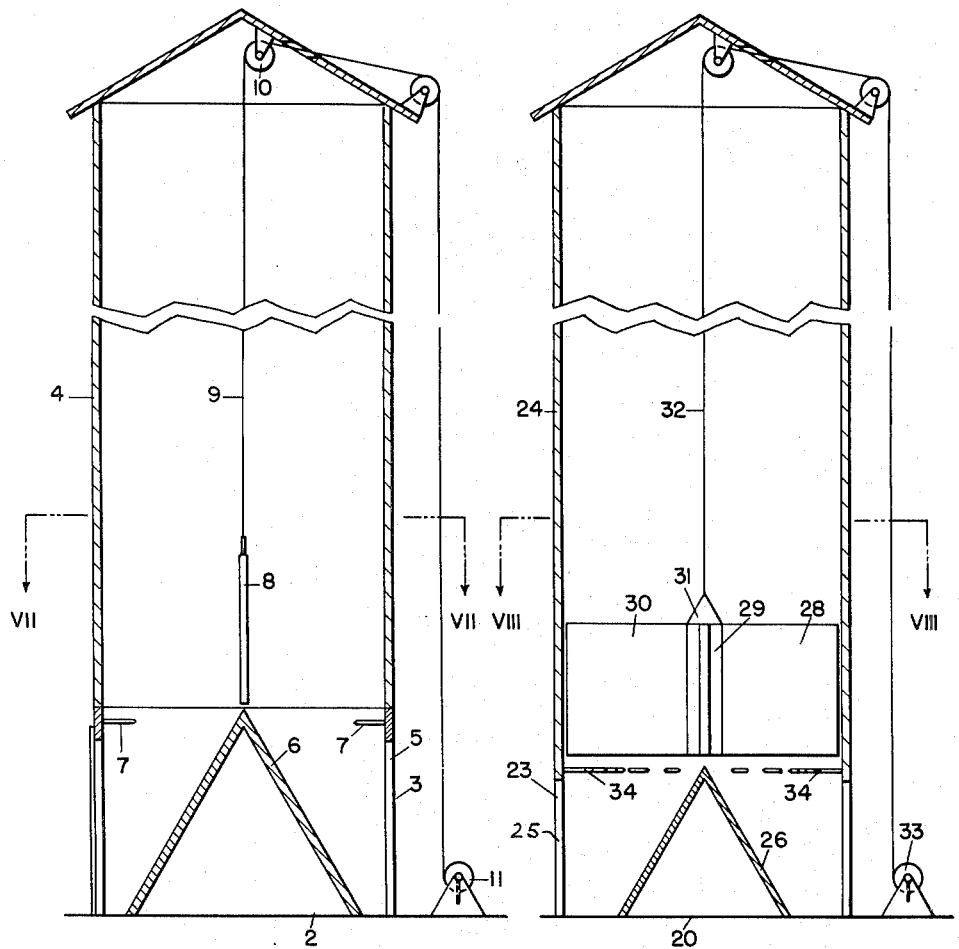
INVENTOR.
Paul M. Mazur
BY Herman Seid
Atty.

July 3, 1956 P. M. MAZUR 2,752,884
SELF-FEEDING STRUCTURES FOR ANIMAL FOODSTUFFS
Filed March 16, 1953 2 Sheets-Sheet 2

INVENTOR.
Paul M. Mazur
BY Herman Seid
atty.

United States Patent Office 2,752,884
Patented July 3, 1956

2,752,884

SELF-FEEDING STRUCTURES FOR ANIMAL FOODSTUFFS

Paul M. Mazur, Titusville, N. J.

Application March 16, 1953, Serial No. 342,589

5 Claims. (Cl. 119—52)

This invention relates to self-feeding structures for animal foodstuffs and, more particularly, to a self-feeding silo in which the masses of silage are packed in such manner as to form separate or cleavage segments, with a vertical line of demarcation between segments, to assure movement of the silage downward in the silo as the lower portion of the silage is consumed by feeding animals to automatically replenish the food supply within the reach of the feeding animal without danger of injury to the animal.

In forming silage, customary practice is to fill the silo with foodstuff such as grass, alfalfa, etc. alone or mixed with corn, meal, molasses or other materials. Usually, such silage is pitchforked from the top of the mass. Attempts have been made to self-feed the animals from a silo thus eliminating the use of farm labor to feed the animals. A great disadvantage, however, in attempting to self-feed animals from a silo resides in the fact that the heavy, entwined, sticky mass adheres together and fails to fall automatically within the silo within the reach of the animal. This prevents self-feeding, of course, since the only way to place the silage within reach of the animal is to use farm labor to break the mass in small portions by pitchforks or picks. Due to these disadvantages, self-feeding silos have not been employed to any substantial extent.

The chief object of the present invention is to provide a structure containing foodstuffs so separated that they are supplied automatically to a feding animal without danger of injury to the animal.

An object of the present invention is to provide a self-feeding silo in which the silage is packed in such manner that a line of cleavage between adjacent portions of silage is produced, permitting easy and ready downward movement of the segments automatically as the lower portions thereof are consumed by feeding animals without danger of injury to the animals.

A further object is to provide a self-feeding silo containing a vertically movable partition member which forms the silage into separate, non-interlaced masses as the silo is filled.

A still further object is to provide a self-feeding silo containing splines which serve to support spaced masses of silage and assist in guiding the masses within easy reach of the feeding animals without danger of injury to the feeding animals or wastage.

A still further object is to provide a simple and effective method of unloading silage. Other objects of the invention will be readily perceived from the following description.

This invention relates to a self-feeding structure for animal foodstuffs which comprises, in combination, a storage chamber, a movable partition member dividing the storage chamber in segments to separate heavy masses of foodstuffs packed in the chamber, and means for raising the partition member to provide cleavage between adjacent non-interlaced massees within the chamber.

This invention further relates to a method of filling a silo with silage in which the steps consist in placing a vertically movable partition member in the storage chamber of a silo, filling the spaces separated by the partition member with silage, raising said member to form masses of silage in the storage chamber separated by a vertical line of cleavage, adding silage to the separate masses present in the chamber, again raising said member thereby cleaving the added masses, and repeating the process until the silo is substantially filled.

The attached drawings illustrate a preferred embodiment of the invention, in which Figure 1 is a sectional view of my self-feeding silo which I call a "tower on the square";

Figure 2 is a sectional view of a modified silo;

Figure 7 is a sectional view taken on the line VII—VII of Figure 1 and illustrating the spline support members;

Figure 8 is a sectional view taken on the line VIII—VIII of Figure 2;

Figure 5:
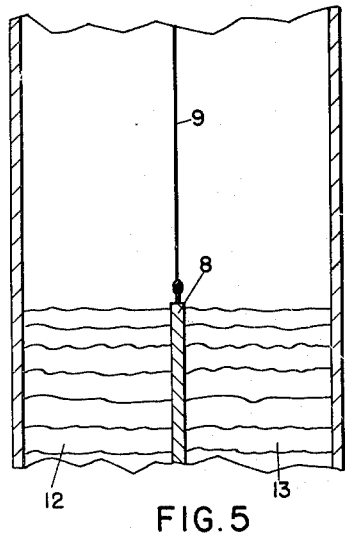
Figure 5 is a sectional view of a portion of a silo illustrating the manner in which the silo is filled.

Referring to the drawings, there is shown the self-feeding silo of the present invention which I term a "tower on the square." The silo includes a concrete base or floor 2 on which is placed a hollow base portion 3 having the general contour of a parallelepiped. Preferably, base portion 3 is formed of concrete blocks to assure adequate support for the silage when the silo is filled. A hollow, cylindrical storage chamber 4 is mounted on base 3 and extends upward therefrom. Preferably chamber 4 is formed of wood so as to be resistant to the acids of the silage; if desired, chamber 4 may be constructed of steel, concrete, tile, etc.

Base 3 is provided with openings 5 through which feeding animals may have access to the stored silage. Spaced stanchions or self-feeding gates (not shown) are employed to prevent the animal entering the silo. These gates may be of the type disclosed and claimed in copending application Serial No. 31,125, filed June 4, 1948.

Extending across the base 3 centrally thereof is a dividing member 6 made of any suitable material which directs silage toward the openings 4 in the base. Splines or spikes 7 may extend through the walls of base 3 to support silage in chamber 4 if desired, the splines 7 preventing compaction and wastage or a mass of silage falling upon a feeding animal and directing the silage toward divider 6.

Figure 3:
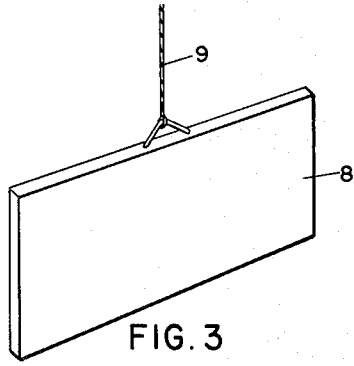
Figure 3 is an isometric view of a partition member used in the silo.

A movable partition member 8 is placed within storage chamber 4 and serves to cleave silage as it is placed within the silo into separate masses thus preventing entwining of the long fibers of one mass of silage with long fibers of an adjacent mass and cohesion of the whole mass of the silage. This partition member 8, as shown in Figures 1, 3 and 7, possesses a length substantially equal to the inner diameter of the storage chamber 4 and is attached to a cable 4 which passes over a pulley 10 supported adjacent the top of the silo. The cable extends downward adjacent the exterior of the silo and is connected to a windlass 11 to permit partition 8 to be raised and lowered within storage chamber 4.

Figure 6:
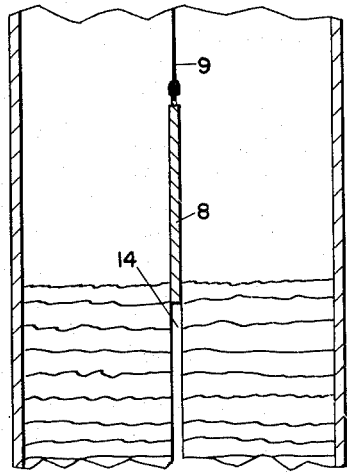
Figure 6 is a sectional view similar to Figure 5 illustrating a further step in the method of filling the silo.

In Figures 5 and 6, I have illustrated the manner in which silage is placed in the silo. The silage is blown in the silo falling therein on opposite sides of partition 8 to form separate masses 12 and 13. As the masses of silage increase in height to a point adjacent the top of partition 8, filling is stopped and the partition 8 is raised by means of windlass 11 to a position shown in Figure 6. It will be noted the masses 12 and 13 are separated by a vertical line of cleavage 14 which forms in effect a "partitionless" partition and prevents entanglement or interlacing of the long fibres of one mass with the long fibres of an adjacent mass. The partition 8 is not raised to a point at which its bottom is above masses 12, 13 to prevent entanglement of silage added to such masses. Silage is again blown in the silo, adding to the separate masses 12, 13 until these masses again increase in height to a point adjacent the top of partition 8. Again, filling is stopped and the partition is raised as described. The process is repeated until the silo is substantially filled. The partition member 8 is suspended adjacent the top of the silo when the silo has been filled or if desired may be removed therefrom. While pressure of silage gradually eliminates the temporary space between the masses formed by member 8, it will be understood the masses 12, 13 remain separated by a definite vertical line of cleavage so that the fibers of the masses are not entangled or interlaced with fibers in an adjacent mass.

Figure 9:
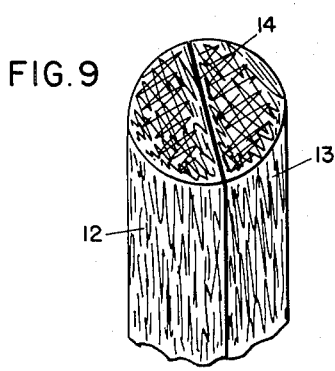
Figure 9 is an isometric view illustrating fragments of the separate masses of silage as they are present in the silo.
Figure 10:
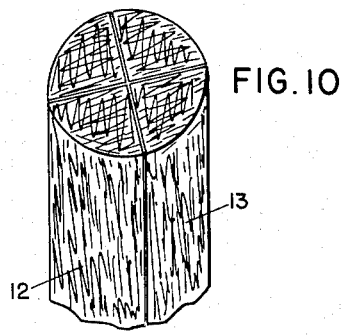
Figure 10 is an isometric view similar to Figure 9, illustrating masses of silage separated by the partition member of Figure 4.

Use of partition member 8 in the manner described forms the silage into segments separated by a definite vertical line of demarcation and prevents entwining of the long fibers of one segment with fibers in an adjacent segment. Thus, as the lower portion of each segment is consumed by the feeding animals, the remainder of the segment automatically moves downward and splits across the edge of the divider to replenish the consumed portion without interference with adjacent segments or obstruction by the adjacent segments. In Figures 9 and 10, I have shown portions of these segments 12, 13 as they are formed when the silo is filled. It will be noted segments 12, 13 are separate and are cleaved cleanly and sharply so that gravity movement of any segment is permitted without interference by the adjacent segment.

The splines 7 support these segments thereby preventing compaction and reducing substantially, if not eliminating, wastage as well as preventing abrupt downward fall thereof which might injure the feeding animals and directing the downward moving segment inwardly toward the divider. The divider directs the segment outwardly within easy reach of the feeding animals to replenish the consumed portions of the silage.

Figure 4:
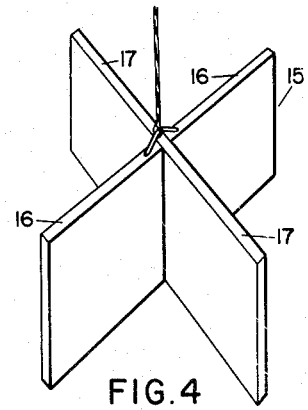
Figure 4 is an isometric view of a modified partition member.

In Figure 4, there is shown a modified partition member 15. Member 15 is in the form of a cross such as a Greek or St. Andrews cross. The arms 16, 17 of the cross, preferably, are of a length substantially equal to the diameter of the storage chamber. It will be appreciated the partition member may have any desired number of arms.

In Figures 2 and 8, I have illustrated a tower type silo. The silo includes a floor 20, a cylindrical base portion 23 and a cylindrical storage chamber 24. Base 3 is provided with openings 25 to permit feeding animals access to the stored silage. A cone-shaped dividing member 26 directs silage toward the openings.

A movable partition member 28 is placed within storage chamber 24 to divide silage into separate masses thus preventing interlacing of fibers in one mass with fibers in an adjacent mass. Partition member 28 includes a central tube 29 having extended vanes 30 connected thereto. The tube may be capped as shown at 31 to prevent silage being blown therein. The vanes 30 need not extend to substantially the inner wall of chamber 24 in this construction since I have found the lines of cleavage formed by the tube and the shorter vanes are adequate to permit automatic feeding of silage.

Cable 32 is attached to tube 29 and windlass 33 to permit movement of the tube and vanes. The storage chamber 24 may be filled with silage as described above.

In this construction, splines 34 preferably extend about the circumference of the tower, as best shown in Figure 8. These splines 34 may extend into the storage chamber at a place adjacent the apex of the cone divider 26 if desired and provide additional support for the silage masses to prevent wastage.

The feeding openings in the silos shown may be closed by bulkheads when the silo is used merely for storage purposes. These bulkheads may be held in desired position by means of spaced stanchions. When it is desired to use the silo for automatic feeding, the stanchions are removed to permit removal of the bulkheads. If desired, the stanchions may then be replaced in position spaced from one another to permit automatic supply of foodstuffs to the animal while preventing the animal from entering the silo.

The present invention provides a storage structure for animal foodstuffs which assures automatic movement of foodstuffs within easy reach of the feeding animals as the supply of available foodstuffs is consumed. The invention is particularly adaptable to self-feeding silos or barns and packs the heavy, cohesive foodstuffs in such manner within the storage chamber that segments of the mass are free to move downward within the storage chamber without interference by adjacent segments. The silage in a silo is packed in separate cleaved portions permitting ready movement of any portion without danger of injury to a feeding animal. The present invention renders self-feeding silos practicable since it assures automatic downward movement of the heavy, cohesive mass as required by the feeding animals.

While I have described a preferred embodiment of the invention, it will be understood that the invention is not limited thereto since it may be otherwise embodied within the scope of the following claims.

I claim:

1. In a storage structure for the storage of forage crops from which animals may self-feed, the combination of a silo portion with an open bottom and supporting means operatively connected to the silo portion, a vertically movable partition member extending horizontally substantially across the silo portion dividing the silo portion in segments to separate masses of silage placed in the silo portion, and means connected to the partition member for raising the partition member while the silo is being filled to provide a line of cleavage between adjacent masses of silage in the silo portion.

2. A storage structure according to claim 1 in which the silo portion is cylindrical and the supporting means comprise a base having the form of a parallelpiped.

3. A storage structure according to claim 1 in which the partition member has a length substantially equal to the interior diameter of the silo portion.

4. A storage structure according to claim 1 in which the partition member is in the form of a cross.

5. A storage structure according to claim 1 in which the partition member comprises a tube member having vane members extending outwardly therefrom dividing the silo portion in segments to separate masses of silage placed in the silo portion.

References Cited in the file of this patent

UNITED STATES PATENTS

| | | |
|---|---|---|
| 682,243 | Cuscaden et al. | Sept. 10, 1901 |
| 1,058,796 | Schott | Apr. 15, 1913 |
| 1,120,178 | Berghofer | Dec. 8, 1914 |
| 1,147,967 | Norquist | July 27, 1915 |
| 1,167,871 | Adams | Jan. 11, 1916 |
| 1,442,820 | Percy | Jan. 23, 1923 |
| 1,624,941 | Fulkerson | Apr. 19, 1927 |
| 1,693,612 | Mabee | Dec. 4, 1928 |
| 2,638,871 | Ruedemann | May 19, 1953 |

FOREIGN PATENTS

| | | |
|---|---|---|
| 37,361 | Denmark | Apr. 4, 1927 |